United States Patent Office 3,492,467
Patented Jan. 27, 1970

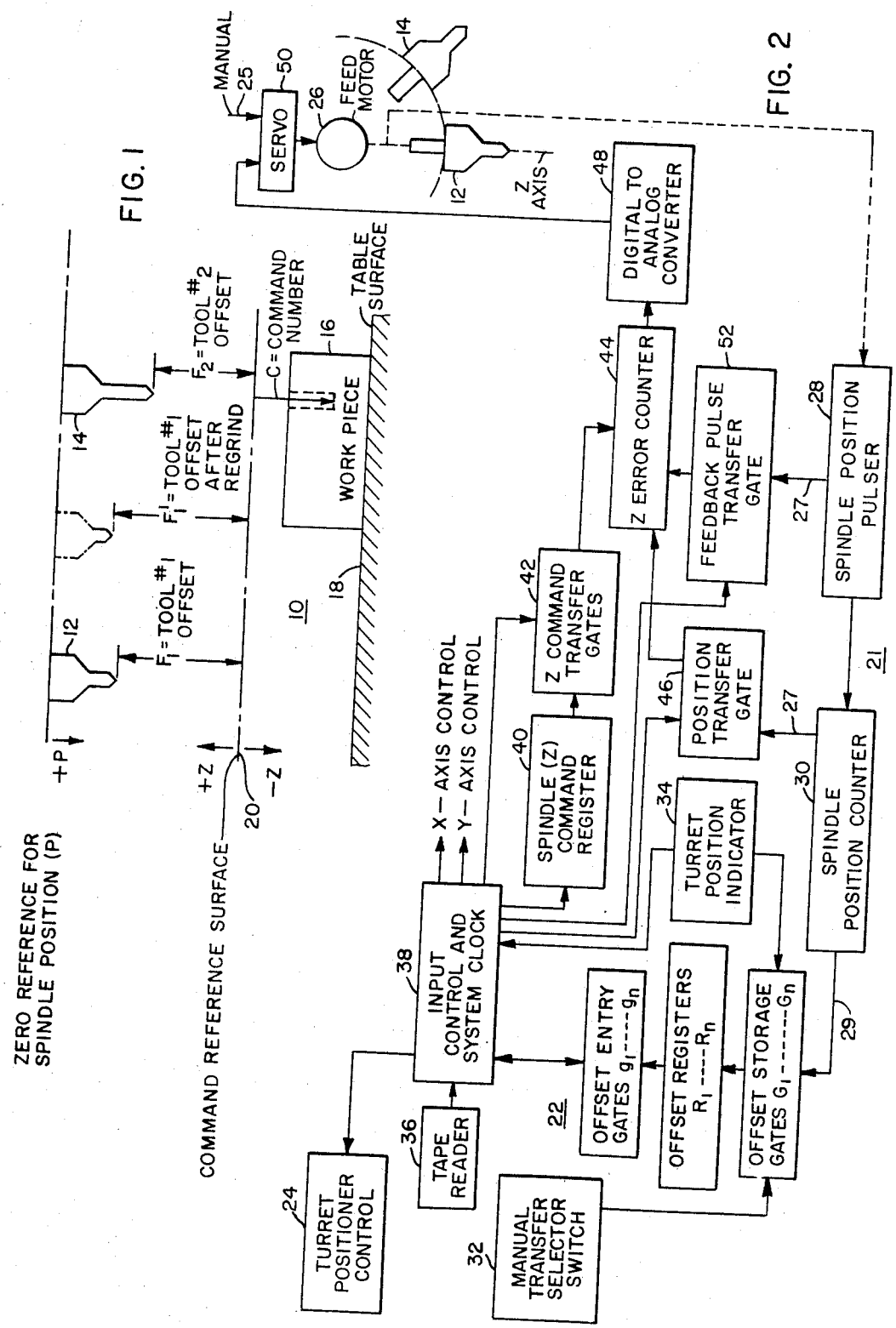

3,492,467
TOOL OFFSET CONTROL FOR DIGITAL NUMERICALLY CONTROLLED POINT-TO-POINT MACHINE TOOLS
Norman L. Caban, Baldwin Boro, Pa., and Donald A. Poepsel, Depew, and Albert T. Bacheler, Amherst, N.Y., assignors to Westinghouse Electric Corporation, Pittsburgh, Pa., a corporation of Pennsylvania
Filed Apr. 7, 1967, Ser. No. 629,171
Int. Cl. G06f 15/46
U.S. Cl. 235—151.11                 6 Claims

ABSTRACT OF THE DISCLOSURE

The numerical offset value of each tool is digitally detected as the tool and a reference surface undergo relative movement through the offset distance along the tool axis. The offset values are fed back to the machine tool digital numerical control for use in tool axis position control during workpiece operations.

BACKGROUND OF THE INVENTION

The present invention relates to point-to-point digital numerical machine tool control systems and more particularly to tool offset controls which are used in such systems in effecting tool axis position control.

In the operation of point-to-point numerically controlled machine tools, the workpiece is moved along the axes (often just two) of workpiece movement to the working position and the work operation is then produced by relative movement between the tool and the workpiece. For example, the machine tool may be a turret drill and the tool may be moved in relation to the workpiece to perform the machining operation.

The depth of workpiece operations may be fixed, or it may be variable and reasonably controllable by manual setup, or it may be variable and require tool axis numerical position control in order to eliminate costly setup procedures. Without offset control, the numerically controlled tools must have exact preselected lengths as determined by gauging or the like, and the tools further must be exactly preset in the machine in order to conform the tool tip location for all tools to the same reference plane. These requirements result in costly operation, and they restrict the operating flexibility of machine tools since tool changes cannot be conveniently made. Further, broken tools ordinarily cannot be reground for reuse without resetting to precise length, and it is accordingly the usual but costly practice to retain a reserve set of tool holders having the preselected length tools exactly preset therein.

To effect tool axis position control without preset tools, compensation must be made for the length of the tool and/or deflection of the tool or workpiece by an offset value for the tool in use. Thus, each random length tool in a turret machine tool, or in a machine tool having automatic tool changing equipment, has a characteristic offset value defined as the distance of the tool tip from a reference plane in or near the work region when the tool spindle and the work table are located in relation to each other in reference zero positions. An offset control applies the appropriate tool offset value to the machine tool numerical control which in turn positions the tool or the work table along the tool axis to produce the commanded work with compensation for the tool offset. As an illustration, the depth of a drilling operation can be numerically specified to a turret drill numerical control and the drilling operation is performed with offset compensation controlled in accordance with the offset value corresponding to the length of the drill used for the operation. Typically, offset values for various tools used in a digital numerically controlled machine tool are entered into the offset control by the time consuming process of manual setting of dials.

Analog position controls for machine tools also often provide offset compensation during work operations. In some cases, operating flexibility is somewhat enhanced by certain analog offset measurement and control techniques. However, these techniques, such as potentiometer balancing of a meter or light circuit, are not directly applicable to digital numerical control systems. Further, these time consuming techniques typically result in a limited amount of available offset compensation.

SUMMARY OF THE INVENTION

In accordance with the principles of the present invention, an offset control for a digital numerically controlled point-to-point machine tool includes means for digitally detecting and registering the offset value of each tool as the tool and a reference surface undergo relative movement through the offset distance along the tool axis. The registered offset data is gated into the numerical control as required to achieve accurate tool axis position control during workpiece operations. With the offset detection and utilization provided by the invention, any amount of offset encountered in practice can be registered instantaneously in the machine tool control without any manual nulling or other time consuming procedure thereby making machine operation more economic and more flexible.

It is, therefore, an object of the invention to provide a novel offset control for digital numerically controlled point-to-point machine tools which provides increased machine operating flexibility and reduced setup time.

Another object of the invention is to provide a novel offset control for digital numerically controlled point-to-point machine tools which provides increased machine operating economy.

An additional object of the invention is to provide a novel offset control for digital numerically controlled point-to-point machine tools which provides for accurate yet relatively simple and convenient tool offset compensation.

These and other objects of the invention will become more apparent upon consideration of the following detailed description along with the attached drawing.

DESCRIPTION OF THE DRAWING

FIGURE 1 schematically shows the work operation portions of a drilling machine and illustrates the concept of tool offset; and FIG. 2 shows a schematic diagram of a machine tool digital numerical control including an offset control arranged and operated in accordance with the principles of the invention.

DESCRIPTION OF THE PREFERRED EMBODIMENT

More specifically, in FIG. 1, there is shown for the purpose of background development a schematic representation of the working portion of a digital numerically controlled point-to-point machine tool in the form of a typical turret drill 10. Any of the machine tool spindles, such as representatively indicated spindles 12 and 14, can be placed in the operating location by means of rotation of the turret through a vertical plane. Once the preselected spindle is located (the spindle 12 in this case), tool axis or Z-axis operations are produced on a workpiece 16 by driving the spindle to predetermined positions. A separate drive (not shown) provides the spindle rotation needed for drilling operations as the spindle is advanced along the tool axis.

The workpiece 16 is located on a work table 18, and prior to tool operations it is positioned by the machine tool numerical control at a specified location in an X-Y reference plane parallel to the table surface and perpendicular to the Z-axis. After X–Y positioning, the operational spindle is caried by the turret at a controlled rate along the Z-axis to a command tool tip position resulting in the desired workpiece operation. The turret and spindle are then retracted along the Z-axis and the workpiece 16 is moved to a new X–Y point for a new operation by the same spindle and tool or by another specified spindle and tool.

A reference plane such as the one indicated by the the reference character 20 is used as a basis for defining Z-axis work product commands for the workpiece 16. As illustrated, the command may be that a hole to depth C be drilled by tool number two (carried by the spindle 14) at a particular X–Y location. The tip of tool number two has an offset $F_2$ from the reference surface 20 when the spindle 14 is in the predetermined zero reference position. The spindle 14 is then controllably moved from its zero position through the distance $F_2+C$ to produce the commanded drilling operation. In the case of tool number one, an offset $F_1$ is applicable. Similarly, other tools have respective coresponding offset values.

Generally, spindle position error is defined by the difference between the actual spindle position P and the algebraic sum of the applicable offset F and the command C. i.e.

(1) $\qquad \text{Error} = P + F - C$ with F and C having signs referred to the zero reference of the Z-axis and P having its sign referred to the spindle zero reference. Thus, in the illustrated case, $$E = 0 + F_2 - (-C) = F_2 + C$$

and the spindle 14 must move the distance $F_2+C$ in the $+P$ direction to correct the position error.

In providing spindle axis position control in accordance with the Equation 1 or its equivalent, offset numbers are entered into the machine tool numerical control. As previously indicated, conventional non-offset compensated controls are encumbered with exact length tool and tool presetting labor requirements and other restrictive limitations.

Improved offset control is achieved by the present invention. As schematically illustrated in FIG. 2, the preferred embodiment of the invention includes a numerical offset control 22 incorporated in a point-to-point machine tool digital numerical control system 21. The controlled machine tool in this instance is a turret drill of the type described in connection with FIG. 1, but in general it can be other turret machine tools such as a turret lathe or it can be a single spindle machine tool of the tool changing magazine type.

The desired spindle, such as the spindle 12, is located in the operating Z-axis location by means of a turret rotator motor (not shown) which is operated by a turret position control 24. Drive power for advancing and retracting the turret and the operating spindle along the Z-axis is provided by a suitable drive mechanism such as an electric feed motor 26 or by other means such as a hydraulic drive. When the turret is being operated for offset detection, the motor 26 can be manually controlled through suitable circuitry as indicated by the reference charatcer 25.

A spindle position pulser 28, which can include a conventional pulse generator, is coupled to the fed motor drive train, or the turret lead screw if provided, or it is otherwise associated with the machine tool turret to generate electrical pulses corresponding to predetermined units of turret Z-axis movement. The pulse output from the spindle position pulser 28 is also suitably characterized to indicate whether the tool movement is in positive or negative direction along the Z-axis.

Feedback loops 29 and 27 employ the spindle position pulser output to detect offset data for the offset control 22 and to develop real time position error measurement for the spindle position control. Thus, in both loops, a spindle position counter 30 is formed from suitable electronic circuitry to count in the up and down directions. It is set at 0 value when the turret is positioned to place the operating spindle at the zero reference position referred to in connection with FIG. 1, i.e. $P=0$.

Each increment of the spindle feed movement in the positive direction along the Z-axis results in the generation of a pulse by the spindle pulser 28, and the spindle position counter is correspondingly upcounted. Conversely, motion of the operating spindle along the Z-axis in the negative direction results in downcounting of the spindle position counter 30. The spindle position counter 30 continuously indicates the actual turret or spindle position whether its count is being used in the offset control mode of operation or in the spindle position control mode of operation.

In the offset control feedback loop 29, the spindle position counter 30 is employed to detect the offset distance for each tool in use in the turret drill. When the spindle position counter 30 is operated in the spindle position control feedback loop 27, it is employed to register actual spindle position for spindle position error determination prior to spindle positioning movement. In the position control mode of operation, the spindle position pulser 28 directly updates the position error as the spindle undergoes movement to the command position.

To detect the offset values, each spindle and its associated tool, when operatively located, is advanced from the spindle zero reference position to the point at which the tool tip just contacts a reference object having its top surface common to the command reference surface 20 (FIG. 1). At this position, the number in the position counter is the offset value for that tool. The reference object can include a suitable conventional gauge (not shown) coupled thereto in order to sense a very small threshold level of deflection or tool tip force. With the use of a gauge, the accuracy of the contact point determination can be within .001 inch or better.

The offset control 22 includes a plurality of offset registers $R_1$ through $R_n$ such as suitable electronic memory devices corresponding in number to the number of tools employed in the machine. When the offset distance of a tool is registered in the spindle position counter 30, the count is transferred to the offset register associated with that tool. The turret is then withdrawn and the next spindle is moved into operating position for detection of the offset distance associated with its tool. The described procedure is repeated until the offset values of all of the tools have been detected and stored in memory.

Transfer of the respective offset counts from the position counter 30 to the offset registers is made through respective offset storage switching means or gates $G_1$ through $G_n$ which are formed by suitable solid state electronic circuits or other means. Operation of the offset storage gates is preferably manually executed by a pushbutton switch or the like as indicated by the reference character 32. After each tool has been moved through the offset distance and tool tip contact with the reference surface has been identified by the operator, the switch 32 is operated and the offset distance is grated into storage. A turret position indicator 34, formed from suitable position detection circuitry, identifies the tool in operating position and controls the offset storage gates $G_1$ through $G_n$ so that pushbutton switching results in transfer of each tool offset count to its assigned offset register. A similar position indicator provides offset storage gate control in response to magazine tool position when the tool changing magazine type of machine is being controlled.

As one alternative to the manual switch 32, the force gauge on the previously indicated reference object can be electrically coupled (not indicated) through a feedback loop to trigger the gates $G_1$ through $G_n$.

The method of storage just described is usable when the gauge height is the same as that of the program zero reference plane. If the zero reference plane is at a height other than that of the gauging surface, the first tool offset is made equal to zero by setting the spindle axis zero reference when the first tool tip is at the gauge surface. Then, after all tool offsets are established, the zero reference plane for programming can be moved by commanding the first tool to be induced to position (first tool offset =0) and manually inputting a Z-axis command to move to the desired program zero reference plane. Z-axis zero is then set at this location before machining starts.

After all of the offset values have been entered into offset register storage, normal work operations of the machine tool can be started and offset compensation is automatically provided in accordance with the particular spindle located in the operating Z-axis position. Offset entry switching means or gates $G_1$ through $G_n$, such as suitable solid state electronic circuits, are automatically controlled to enter into the numerical positioning control the particular offset value corresponding to the operating tool.

In brief summary of the offset control performance characteristics, any amount of offset can be entered into the offset control 22 within the dimensional working limits of the machine tool itself. Further, offset values are detected and entered into the offset control 22 in a convenient and economic manner while requirements that the tools have predetermined exact lengths and that they be preset in the spindles in exact locations are eliminated. In addition, broken tools can be reground and reused with convenient offset determination and control, and extra sets of chucks with exact length and exactly preset tools can be eliminated.

The positioning control part of the numerical control 21 can be any suitable control system such as that indicated generally in FIG. 2. Thus, a tape reader 36 can supply the input data defining the work operations and auxiliary functions to be performed by the turret drill. The work information is set forth in terms of X and Y commands, tool selection commands, and Z commands. The latter defines the depth to which work is performed in a workpiece and must be compensated for offset before they can be effected.

Output data from the tape reader 36 is accepted by an input control 38 which, in general, stores and addresses the input commands and correlates various other parts of the numerical control 21 in effecting machine operations in accordance with the commands. A conventional system clock is included for timing purpose in connection with logic sequencing and the like.

An example of an auxiliary function routed through the input control 38 would be tool selection as effected by operation of the turret position control 24. Confirmation of proper turret positioning would be fed back to the input control 38 by the turret position indicator 34. Another example of an auxiliary function would be the spindle speed commands effected through spindle motor speed control (not indicated).

After required offset entries are made in the offset detection mode of operation of the pulser 28 and the counter 30, the positioning control mode of operation is started. X and Y position commands are addressed to X and Y position controls which are similar to a Z-axis control to be described herein. In response to the entry of X and Y commands, the workpiece is driven sequentially or simultaneously along the X and Y axes by X and Y motors (not shown) until the X and Y command positions are reached at zero error. The workpiece is then positioned for the command tool operation along the Z-axis.

In the Z-axis positioning control, the Z command number is entered from the input control 38 into a command register 40 which is formed from suitable electronic circuitry. From the Z command register 40, the Z number is transferred through one or more transfer gates 42 to a reversible error counter 44 which is also formed from suitable electronic circuitry.

The command and offset and error numbers can be processed in any suitable form such as binary coded decimal or pure binary. Further, the electronic counting and processing logic circuitry can operate in the parallel mode or the serial mode.

At the startup of each Z-axis positioning operation, the Z command is addressed to the command register 40 from the input control 38 and the error counter 44 is cleared. Next, the input control 38 operates a transfer gate 46 to transfer the present spindle position number P to the error counter 44 from the spindle position counter 30. Once the transfer is made, the gate 46 is opened.

In sequence, the Z command number and the applicable offset number, as controlled by logic operation of the offset entry gate corresponding to the operatively positioned spindle, are next entered into the error counter 44 by operation of the transfer gates 42 and combined with the present spindle position count in accordance with Equation 1.

An initial position error count is thus developed and it is applied to a digital to analog converter 48 as soon as the input control 38 senses that all required Z positioning operation conditions have been met. The output from the converter 48 is applied to a suitable servo device 50 which in turn operates the feed motor 26 to drive the turret and the operatively positioned spindle in a direction which reduces the position error.

Simultaneously, the input control 38 operates a feedback pulse transfer gate 52 which gates the Z-axis feedback pulses to the error counter 44. As the feedback pulses reduce the error count, the amplitude of the output from the converter 48 decreases until, at zero error count, the feed motor 26 stops the movement of the turret and the operatively positioned spindle along the tool axis. The tool tip is then located precisely at the command Z position as a result of the offset compensated positioning operation produced by the Z-axis positioning control in conjunction with the efficient and convenient offset control 22. The same result is realized as the different tools are employed from machine operation to machine operation, since the appropriate offset number is always entered into the Z axis positioning control from the offset register R in each machine operation.

The foregoing description has been presented only to illustrate the principles of the invention. Accordingly, it is desired that the invention not be limited by the embodiment described, but, rather, that it be accorded an interpretation consistent with the scope and spirit of its broad principles.

What is claimed is:

1. In a point to point machine tool digital numerical control system having a tool axis positioning control, an offset control comprising means for digitally detecting relative tool axis movement between an operatively located tool of the machine and a predetermined reference surface, means for registering the characteristic tool offset value when the tool and the reference surface undergo relative movement through the offset distance as detected by said digital detecting means, and means for transferring the tool offset value for combination with relative tool position and tool command data in the tool axis positioning control at a predetermined time.

2. An offset control as set forth in claim 1 wherein said registering means includes a position counter responsive to said digital detecting means and at least one register for storing the count in said position counter when it reaches the offset value.

3. An offset control as set forth in claim 1 wherein a plurality of tools are selectively locatable for operation and wherein said registering means includes a position counter responsive to said digital detecting means to indicate the offset value of each tool as it undergoes relative offset distance movement with the reference surface, a plurality of registers for respectively storing the position counter generated offset values, and said transferring means selectively transfers the tool offset value corresponding to the tool in use.

4. An offset control as set forth in claim 3 wherein said position counter and said digital detecting means are coupled to the tool axis positioning control to establish an initial position error count and to establish position feedback data for position error determination during positioning operation.

5. An offset control as set forth in claim 3 wherein said transferring means includes a plurality of logically controlled offset entry gates associated respectively with said registers.

6. An offset control as set forth in claim 3 wherein the machine tool is a type selected from the turret and tool changing magazine types and respective gating switches couple said counter with said registers, means for detecting operative positioning of each tool in order to control the gate switch operations for storage of each offset value in a corresponding register, and means for effecting gate switch operation as each offset value is accumulated in the counter for transfer to storage.

References Cited

UNITED STATES PATENTS

| | | | |
|---|---|---|---|
| 3,211,896 | 10/1965 | Evans et al. | 318—162 XR |
| 3,173,315 | 3/1965 | Fuldner et al. | 77—32.1 |

FRANCIS S. HUSAR, Primary Examiner

U.S. Cl. X.R.

29—568; 77—25, 32.1; 318—162